(12) United States Patent
Gilson

(10) Patent No.: US 8,867,627 B2
(45) Date of Patent: Oct. 21, 2014

(54) TRANSMISSION OF COMPRESSED DATA STREAM WITH COMPENSATION VALUES

(75) Inventor: Ross Gilson, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 773 days.

(21) Appl. No.: 12/644,377

(22) Filed: Dec. 22, 2009

(65) Prior Publication Data

US 2011/0150102 A1 Jun. 23, 2011

(51) Int. Cl.
*H04N 7/26* (2006.01)
*H04N 21/2365* (2011.01)
*H04N 21/462* (2011.01)
*H04N 21/2343* (2011.01)
*H04N 21/63* (2011.01)
*H04N 21/24* (2011.01)

(52) U.S. Cl.
CPC ..... *H04N 21/23655* (2013.01); *H04N 21/4621* (2013.01); *H04N 21/234327* (2013.01); *H04N 21/631* (2013.01); *H04N 21/2402* (2013.01)
USPC .................................................. 375/240.27

(58) Field of Classification Search
CPC ............................. H04N 21/238; H04N 21/24
USPC ................................................... 375/240.27
See application file for complete search history.

(56) References Cited

U.S. PATENT DOCUMENTS

| 7,184,433 | B1* | 2/2007 | Oz | 370/389 |
| 7,292,602 | B1 | 11/2007 | Liu et al. | |
| 2005/0165911 | A1* | 7/2005 | Homiller | 709/219 |
| 2005/0232216 | A1* | 10/2005 | Webster et al. | 370/343 |
| 2009/0122877 | A1* | 5/2009 | Haskell | 375/240.26 |
| 2010/0278086 | A1* | 11/2010 | Pochiraju et al. | 370/310 |

FOREIGN PATENT DOCUMENTS

WO 2009078546 6/2009

OTHER PUBLICATIONS

European Search Report for EP 10192677 dated Mar. 11, 2011.

* cited by examiner

*Primary Examiner* — Sath V Perungavoor
*Assistant Examiner* — Jeffery Williams
(74) *Attorney, Agent, or Firm* — Banner & Witcoff, Ltd.

(57) ABSTRACT

In a data transmission system such as a television service provider system, compensation value data corresponding to information lost during lossy compression of program content (which may or may not already be compressed prior to the lossy compression) may be sent to a customer along with the lossy-compressed content. At the customer end, the compensation value data may be used during decompression to provide higher quality content to the customer than would otherwise be experienced without access to the compensation values.

20 Claims, 6 Drawing Sheets

TRANSMISSION OF COMPRESSED DATA STREAM WITH COMPENSATION VALUES

BACKGROUND

Television service providers typically multiplex a large number of channels onto a single transport medium. The content for these channels is usually compressed into one or more Moving Picture Experts Group (MPEG) standard transport streams, with each channel being represented by a different program identifier (PID) contained in each data packet. Each transport stream is, in turn, modulated onto a respective carrier wave within a dedicated region of bandwidth around that carrier wave. Each region of bandwidth is sometimes referred to as a "QAM," which also stands for "quadrature amplitude modulation," because that is a typical carrier modulation technique used. In fact, the term QAM is variously used to refer to the carrier modulation technique, the region of bandwidth, and even equipment used to perform the modulation or otherwise process the modulated transport stream.

Each QAM bandwidth region typically has a fixed maximum bandwidth capacity and contains a subset group of the channels. For instance, a particular QAM bandwidth region may contain two or more high-definition channels per QAM bandwidth region, or ten to twenty standard definition channels. Regardless of how the channels, or PIDs, are divided amongst the QAM bandwidth regions, the total bandwidth of the channels carried on a QAM bandwidth region is not supposed to exceed the total fixed capacity of that QAM bandwidth region. However, the total bandwidth of a group of channels is difficult to determine, because the actual bandwidth needed by each channel can vary widely and unpredictably over time. Factors that affect the variability in bandwidth needed by a channel include, for instance, the amount of motion in a video scene or the number of quick cuts between scenes.

Therefore, while television service providers would like to maximize the number of channels on each QAM bandwidth region, they are limited somewhat by unpredictable variations in actual bandwidth used by the channels. If the actual bandwidth exceeds the QAM bandwidth region capacity, then the quality of the content may temporarily drop for all MPEG streams contained within the same QAM bandwidth region, resulting in artifacts such as blocking and freezing of video and distortion of audio. The provider can put fewer channels on each QAM bandwidth region to reduce the probability of exceeding QAM bandwidth region capacity. However, this is not ideal because a portion of bandwidth in that region will go unused most of the time. To deal with this problem, many providers implement an MPEG groomer, which further compresses the content for each channel on a QAM bandwidth region at times when the total bandwidth needed by the channels on that QAM bandwidth region would otherwise exceed the capacity of that bandwidth region. This additional compression (sometimes called "recompression") is typically lossy, meaning that information is irreversibly removed from the transmitted data so that the data may be smaller. Therefore, such recompression causes an inevitable drop in content quality as received by the customer/television viewer. While the recompression quality drop is expected to be smaller and more controllable than the quality drop that would occur by simply letting the actual bandwidth exceed the capacity of the QAM bandwidth region, such a quality drop is still undesirable.

SUMMARY

Techniques are discussed that may reduce or even eliminate the quality drop experienced by the viewer when lossy compression (e.g., initial compression and/or subsequent recompression) is performed. In general, data representing compensation values corresponding to the information lost during compression may be sent to the customer along with the compressed content. At the customer end, the compensation values may be used during decompression to provide higher quality content to the customer than would otherwise be experienced without access to the compensation values. By having access to the compensation values, the customer receiver equipment may therefore partially or fully reverse the compression performed by the service provider's MPEG groomer.

To avoid utilizing bandwidth in a QAM bandwidth region in which the content is already being compressed (referred to herein as a "content QAM"), the compensation values may be transmitted utilizing bandwidth outside that content QAM. For example, the compensation values may be provided on a QAM bandwidth region (referred to herein as a "compensation QAM") different from the content QAM on which the associated compressed content is transmitted. Thus, the information previously lost to compression may still be received by the customer without requiring any additional bandwidth in the content QAM. In addition, multiple content QAMs may share the same compensation QAM and/or utilize more than one compensation QAM.

Thus, for example, some aspects are directed to a method, comprising: compressing data to generate compressed data; determining compensation value data representing information lost during said compression; transmitting at least a portion of the compressed data in a first frequency band; and transmitting the compensation value data in a second frequency band different from the first frequency band.

Further illustrative aspects are directed to a system, comprising a compressor and a transmitter. The compressor may be configured to compress data to generate compressed data, and determine compensation value data representing information lost during compression. The transmitter may be configured to transmit the compressed data in a first frequency band, and transmit the compensation value data in a second frequency band different from the first frequency band.

Still further illustrative aspects are directed to a method, comprising receiving a first transmission in a first frequency band, the first transmission representing compressed data; receiving a second transmission in a second frequency band different from the first frequency band, the second transmission representing compensation value data; decompressing at least a portion of the compressed data using at least some of the compensation value data to generate decompressed data; and displaying the least a portion of the decompressed data as video on a display device.

Yet further illustrative aspects are directed to an apparatus, comprising a receiver and a decompressor. The receiver may be configured to receive a first transmission in a first frequency band, the first transmission representing compressed data, and receive a second transmission in a second frequency band different from the first frequency band, the second transmission representing compensation values. The decompressor may be configured to decompress at least a portion of the compressed data using at least some of the compensation values to generate decompressed data.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
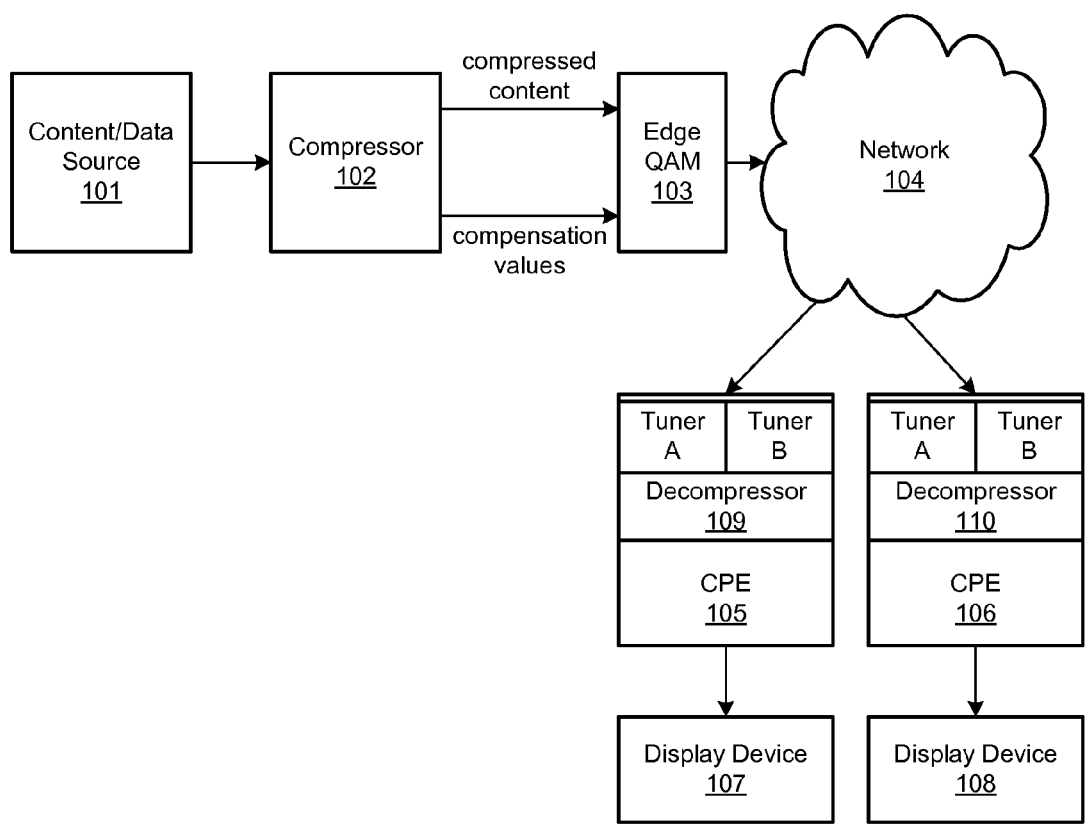
FIG. 1 is a functional block diagram of an illustrative system for transferring compressed data to one or more customers.

FIG. 1 is a functional block diagram of an illustrative system (such as a cable, fiber optic, satellite, or hybrid television program provider system) for transferring compressed data to one or more viewers or other clients. The system in this example includes a content/data source 101, a compressor 102, an edge QAM 103, a network 104, a first client represented by customer premises equipment (CPE) 105 and a second client represented by CPE 106. Each of CPE 105, 106 may include or be coupled to a display device 107, 108, such as a television display or computer display. Although each functional block 101-106 is shown as a single element in FIG. 1, it is to be understood that any of the functional blocks 101-106 may be implemented as one or more physical units. Each of the functional blocks 101-106 will now be discussed in turn.

Content/data source 101 may generate or otherwise provide data to be compressed by the system. The data may represent, for example, audio and/or video content (such as a television show or a movie) that may or may not already be compressed such as by MPEG compression. However, the data may be any arbitrary type of data that is desired to be transferred to CPE 105 and/or CPE 106.

Compressor 102 compresses the data received from content/data source 101 using any type of compression desired. For example, compressor 102 may compress the data into one or more transport streams, such as MPEG transport streams. Compressor 102 may be or otherwise include an MPEG groomer. Where the data from content/data source 101 is already compressed, the compression performed by compressor 102 may be recompression. In general, the terms "compression," "compress," or "compressed" as used herein refers to both initial compression and any subsequent recompression, unless otherwise specified.

Compressor 102 may determine whether compression is needed, and/or the amount and/or type of compression to be used, based on the bandwidth of the data received from content/data source 101. The determination may depend upon whether the content data destined for one or more content QAMs will fit within those content QAMs. In other words, for each content QAM in which the associated content data bandwidth is determined to exceed the bandwidth of that content QAM, compressor 102 may compress (which includes initial compression or recompression after initial compression) the content data so as to fit within that content QAM. Compressor 102 may also generate compensation values based on that compression. Data representing the compressed content data and the compensation values are then fed to edge QAM 103 for distribution to customers. Compressor 102 may further compress the compensation value data if desired.

Edge QAM 103 in turn modulates the received compressed data and compensation value data, modulates the compressed data and/or compensation value data into one or more content QAMs and/or compensation QAMs, and forwards the content and/or compensation QAMs to CPE 105 and 106 (and/or other CPEs) via network 104. Edge QAM 103 may include a transmitter as network input/output interface 204 (FIG. 2) that is capable of simultaneously transmitting to network 104 the content QAM(s) and/or the compensation QAM(s).

Network 104 may be any type of network or combination of networks, such as but not limited to the Internet, a dedicated cable, fiber optic, satellite, or hybrid television distribution network, a wireless cellular network, and/or a local area network. Network 104 may be configured so as to have sufficient capacity to provide the modulated content and/or compensation QAMs in near real time.

CPE 105 and 106 may each be or otherwise include any type of device or system for receiving, processing, decompressing, and rendering the content data on the content QAMs. CPE 105 and 106 may further be capable of receiving and utilizing the compensation values during decompression. In the present example, each of CPE 105 and 106 includes a decompressor 109, 110, and two tuners arbitrarily named Tuner A and Tuner B. These tuners may be physically implemented separately (e.g., two separate sets of tuner circuitry) and/or may be physically implemented as a single tuner with multiple simultaneous tuning capability (e.g., a single physical tuner implementing two logical tuners). In either case, CPE 105 and 106 may each be configured to be capable of simultaneously receiving and tuning to more than one channel in one or more content QAMs and/or compensation QAMs. Thus, for example, CPE 105 and 106 may each be capable of tuning not only to a particular content PID in a particular content QAM, but also simultaneously to a particular PID in a compensation QAM containing the compensation value data. Many conventional CPE devices already contain multi-tuning capability, such as set top boxes and television sets having picture-in-picture (PiP) functionality. In such a case, Tuner A may be the standard tuner and Tuner B may be the PiP tuner, or vice-versa. Tuners A and B may also include receivers for receiving all data from network 104. Decompressors 109, 110 may be implemented as dedicated hardware decompressors, and/or as software decompressors. For instance, decompressors 109, 110 may be implemented by functions performed by processor 201 (FIG. 2).

All of functional blocks 101, 102, 103, 105, and 106 each may be implemented as, or otherwise include, one or more computers. The term "computer" as referred to herein broadly refers to any electronic, electro-optical, and/or mechanical device, or system of multiple such devices, that is able to process and manipulate analog and/or digital information, such as in the form of data. Non-limiting examples of a computer include one or more personal computers (e.g., desktop or laptop), servers, cellular phones, personal digital assistants (PDAs), television set top boxes, and/or a system of these in any combination or subcombination. In addition, a given computer may be physically located completely in one location or may be distributed amongst a plurality of locations (i.e., may implement distributive computing). A computer may be or include a general-purpose computer programmable to implement a wide variety of functions, and/or a dedicated computer that is configured to perform only certain limited functions.

Figure 2:
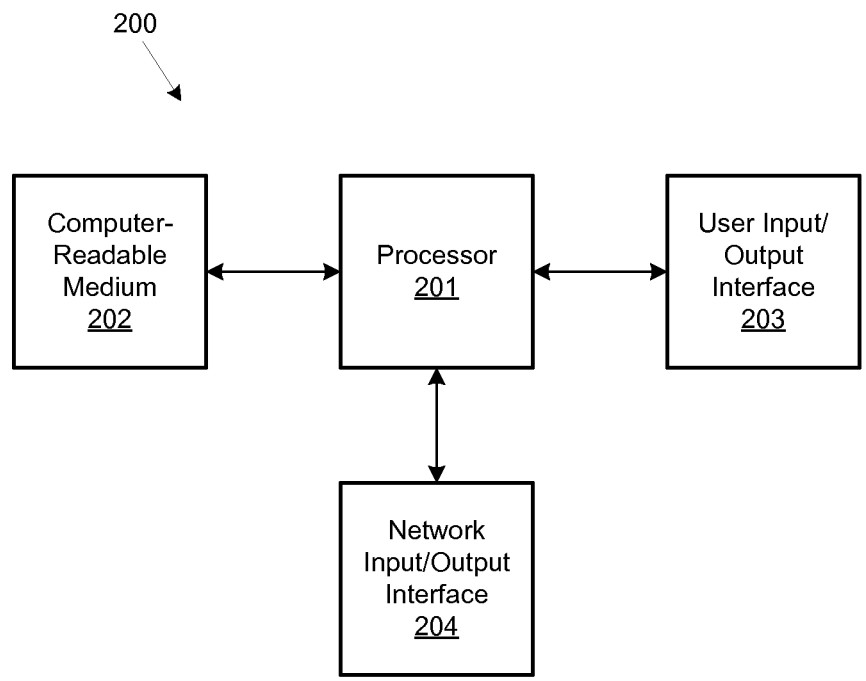
FIG. 2 is a functional block diagram of an illustrative computer that may be used to implement one or more elements of the system of FIG. 1.

An example functional-block representation of a computer 200 is shown in FIG. 2, from which any of blocks 101, 102, 103, 105, and 106 may be implemented. Computer 200 may include hardware that may execute software and/or be configured in hardware to perform specific functions. The software may be stored on a computer-readable medium 202 in the form of computer-readable instructions. Computer 200 may read those computer-readable instructions, and in response perform various steps as defined by those computer-readable instructions. Thus, any functions attributed to blocks 101, 102, 103, 105, and 106 as described herein may be implemented, for example, by reading and executing such computer-readable instructions for performing those functions, and/or by any hardware subsystem (e.g., a processor 201) from which computer 200 is composed.

The term "computer-readable medium" as used herein includes not only a single physical medium or single type of medium, but also a combination of one or more physical media and/or types of media. Examples of a computer-readable medium include, but are not limited to, one or more memory chips, hard drives, optical discs (such as CDs or DVDs), magnetic discs, flash drives, and magnetic tape drives.

Such a computer-readable medium 202 may store computer-readable instructions (e.g., software) and/or computer-readable data (e.g., information that may or may not be executable). In the present example, computer-readable medium 202 (such as memory) may store computer-executable instructions and/or data used by any of blocks 101, 102, 103, 105, 106. Alternatively or additionally, such a computer-readable medium 202 storing the data and/or software may be physically separate from, yet accessible by, blocks 101, 102, 103, 105, 106.

Computer 200 also includes a user input/output interface 203 for receiving input from a user (e.g., via a keyboard, mouse, and/or remote control) and providing output to the user (e.g., via display device 107 or 108, an audio speaker, and/or a printer). Computer 200 further includes a network input/output interface 204 for communicating with a network such as network 104, and/or for communicating with external devices directly. Thus, any communication between blocks 101, 102, 103, 105, and 106 and users, network 104, and each other may be attributed to communication via user input/output interface 203 and/or network input/output interface 104 of those respective blocks.

Figure 3:
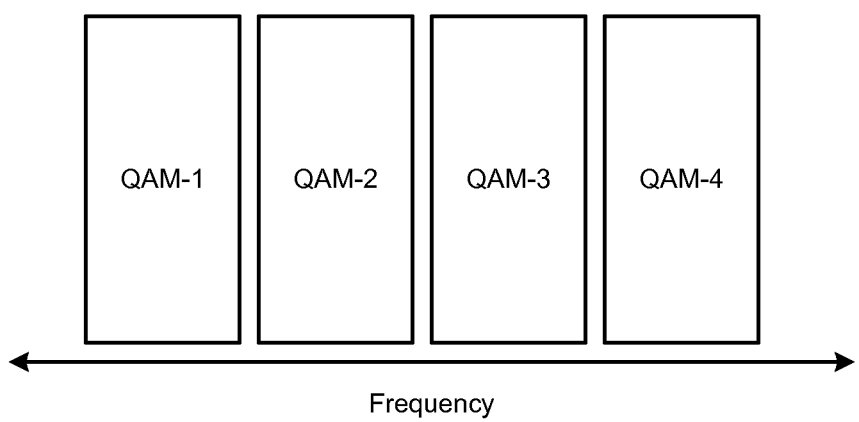
FIG. 3 graphically shows illustrative QAM bandwidth regions in which the compressed data may be transferred.

FIG. 3 graphically shows illustrative QAM bandwidth regions QAM-1, QAM-2, QAM-3, and QAM-4, in which the compressed data may be transferred over network 104. The QAM bandwidth regions may be content QAMs and/or compensation QAMs. For example, QAM-1, QAM-2, and QAM-3 may each be a content QAM containing multiple content channels, and QAM-4 may be a compensation QAM. While QAM-1, QAM-2, QAM-3, and QAM-4 are each illustratively shown as a single continuous frequency band, one or more of QAM-1, QAM-2, QAM-3, and QAM-4 may each be composed of multiple discontinuous frequency bands. Also, while a compensation QAM such as QAM-4 may be a dedicated compensation QAM, the compensation value data therein may share bandwidth with other data, such as in the same QAM that transfers data, such as DOCSIS (Data Over Cable Service Interface Specification) data. Also, while QAM-1, QAM-2, QAM-3, and QAM-4 are each illustratively shown as frequency bands that do not overlap each other in frequency, it is possible that one or more of these frequency bands may overlap in frequency.

Figure 4:
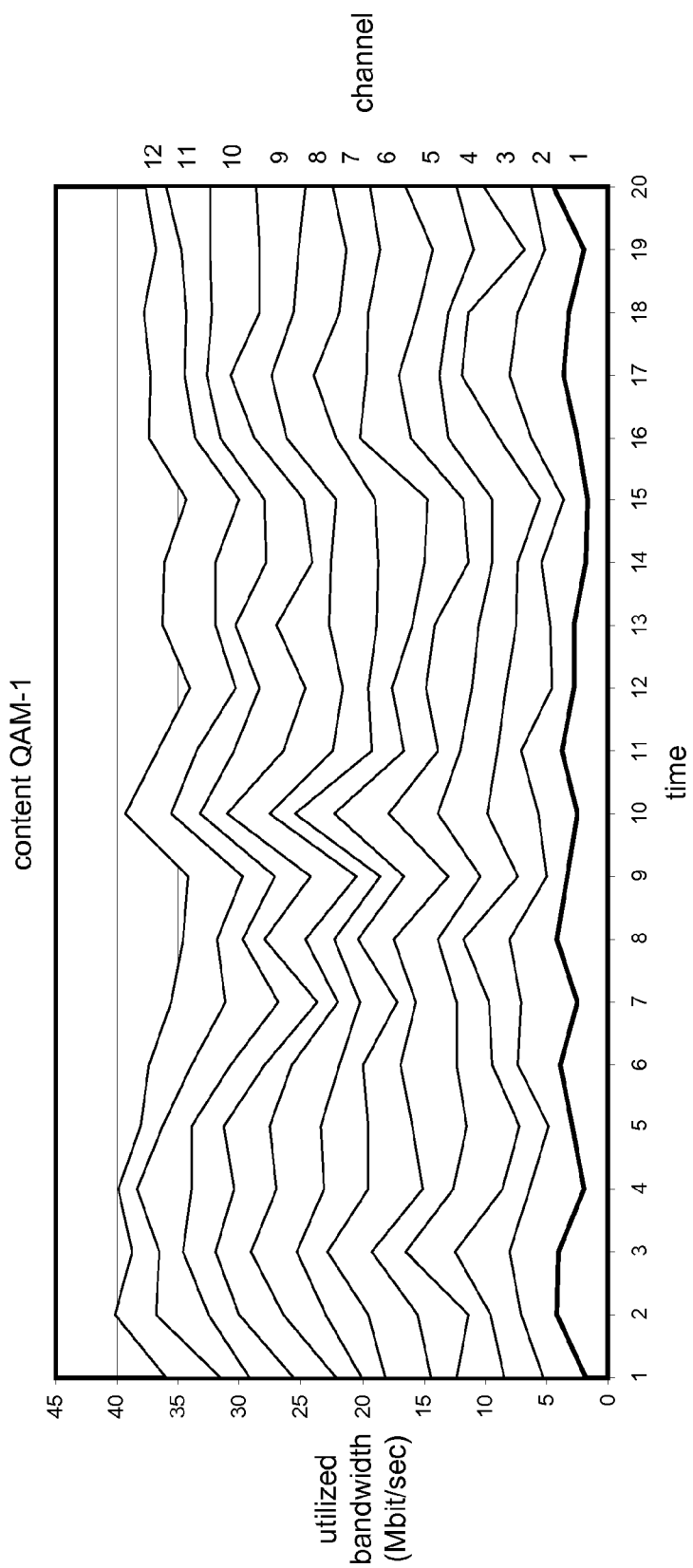
FIG. 4 is a graph showing illustrative utilized bandwidth over time within one of the bandwidth regions of FIG. 3.

FIG. 4 is a graph showing illustrative utilized bandwidth over time within one of the bandwidth regions of FIG. 3, such as QAM-1. In this example, content QAM-1 includes twelve channels (arbitrarily numbered 1-12), and has a maximum fixed bandwidth capacity of 38.81 Mbit/sec (which is the standard maximum capacity for a 256-QAM modulated 6 MHz wide QAM bandwidth region). While much of the time the total utilized bandwidth is less than the maximum bandwidth capacity, in a few instances (e.g., at about time=2, time=4, and time=10) the total utilized bandwidth for channels 1-12 equals or approaches 38.81 Mbit/sec. Thus, at and/or around those identified times, compressor 102 may identify this situation, and in response compress the data for one or more of channels 1-12 such that the total bandwidth of channels 1-12 is equal to or less than 38.81 Mbit/sec, as would be accomplished by a conventional MPEG groomer. In addition, compressor 102 would generate compensation values associated with the compression. Of course, other maximum bandwidths may be used, depending upon the configuration of the QAM bandwidth regions. For example, a QAM bandwidth region using 64-QAM modulation would normally have a maximum bandwidth capacity of 26.97 Mbit/sec.

Figure 5:
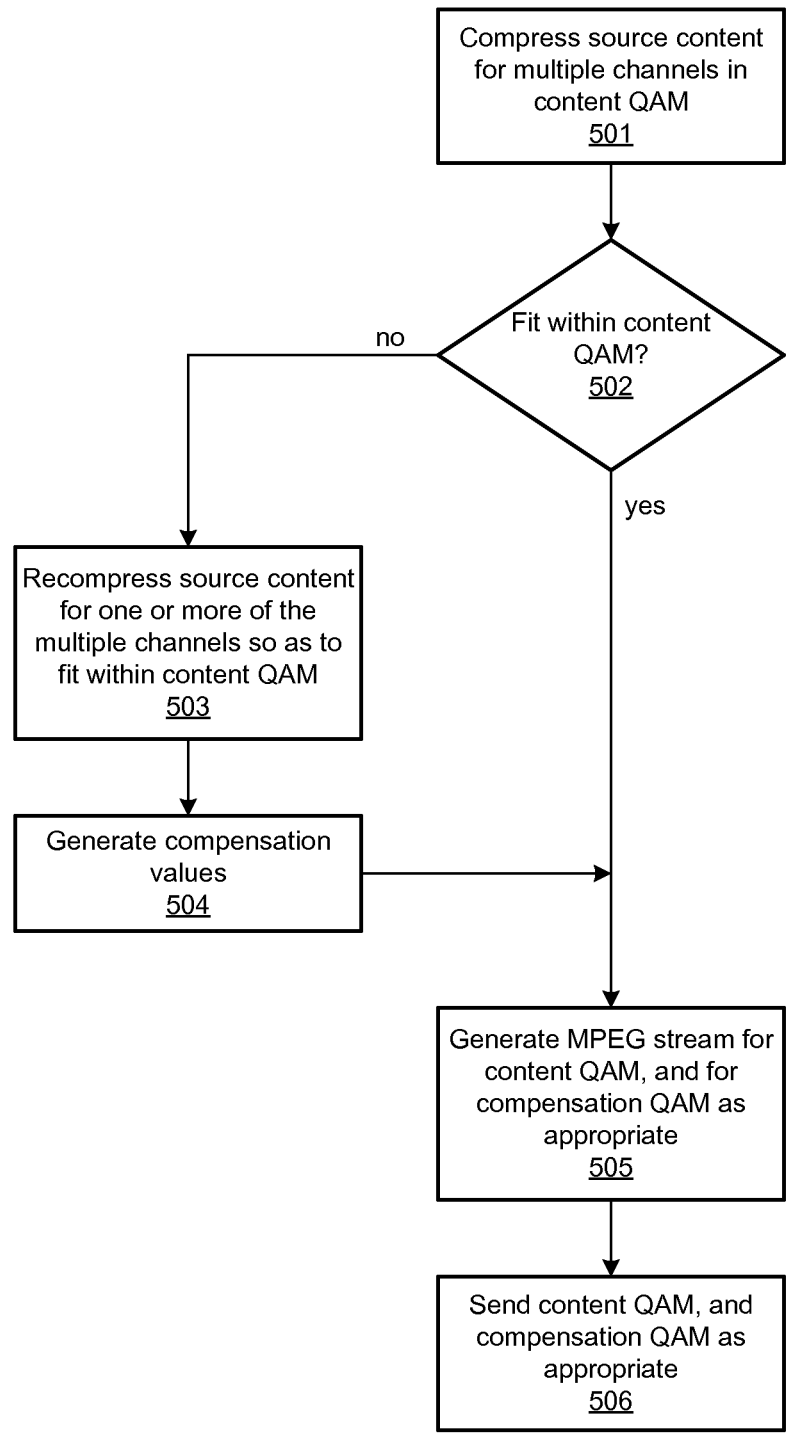
FIG. 5 is a flowchart of an illustrative process that may be performed by the system of FIG. 1 to transfer the compressed data to the one or more customers.

FIG. 5 is a flowchart of an illustrative process that may be performed by the system of FIG. 1 to transfer the compressed data to the one or more customers. In step 501, content data provided by content/data source 101 may be compressed (if not already compressed) by compressor 102 for modulation into one or more content QAMs. Compressor 102 may know the maximum allowable bandwidth of each content QAM, and may check to ensure that the total compressed bandwidth of the content for each QAM does not exceed the maximum allowable bandwidth (or does not exceed some other threshold bandwidth less than the maximum allowable bandwidth). In other words, for each set of channels destined for a given content QAM, compressor 102 may determine whether the content for that set of channels will fit within the associated content QAM (step 502). If, for a given content QAM, the content will fit (such as occurs at times=5 through 9 in FIG. 4), then in step 505 the content as-is formatted and modulated by edge QAM 103 into the content QAM, and in step 506 the content QAM is sent into network 104 for broadcasting, multicasting, unicasting, or other type of transmission to CPE 105 and/or 106. Because multiple content QAMs are typically sent simultaneously with each other, the above process may be performed for all of those content QAMs.

If, however, the content for the set of channels is determined not to fit (such as might occur at time=2 in FIG. 4), then compressor 102 may compress, or further compress, the data for that content such that it will fit (step 503). For example, compressor 102 may sufficiently compress the content of QAM-1 such that its bandwidth is no greater than 40 Mbit/sec. The type and amount of compression may be altered as needed to ensure the utilized bandwidth is maintained within the established limit. As discussed previously, in many cases such compression may involve lossy compression because non-lossy compression would be insufficient to reduce the bandwidth below the established limit. In that case, compressor 102 may generate one or more compensation values in step 504 and forward those compensation values as data along with the compressed content to edge QAM 103. In turn, in steps 505 and 506, edge QAM 103 processes the compressed content as data packets, each identifying the channel PID, into a content QAM, and processes the compensation values as data packets, each identifying a compensation value PID, into a compensation QAM that utilizes bandwidth that may be different from the content QAM. It is noted that such lossy compression may be performed in addition to any earlier lossy or non-lossy compression already performed on the content. Thus, the determination of whether the content bandwidth exceeds the content QAM maximum bandwidth may be based on the bandwidth of the initially compressed content as received by compressor 102.

The compensation values may be values that identify the information lost during the lossy compression. For example, where the lossy compression loses higher resolution information (e.g., highly detailed image features), the compensation values may identify that higher resolution information. Any one or more features of the video and/or audio signal may be lowered in resolution in this lossy compression process. For example, the number of available colors may be reduced and/or the number of pixels in each video image frame may be reduced. Another way to compress the video may be to alter the compression quantization matrix to eliminate higher frequency components from the image.

In another example, encoding similar to JPEG 2000 progressive resolution encoding may be used for video encoding. For instance, each video frame may be considered a still image and individually encoded using JPEG 2000 or a similar encoding technique. In such a case, multiple layers for each video frame may be compressed, where the layers are ordered from most significant to least significant (in terms of the amount that each layer affects the video image). In this way, any overflow into the compensation QAM may start with the least significant layers, thereby affecting the video as little as possible in the event that the compensation value data is not utilized by the customer. Thus, in this example, the compensation values would be or otherwise represent those layers that were removed from the JPEG 2000 encoded frames being sent over the content QAM.

Regardless of the type of information lost during this compression, by separating out the compensation value data identifying the lost information, the original MPEG stream may be split between the content QAM and the compensation QAM such that the content QAM maximum bandwidth is not exceeded. Moreover, because the customer receives both the content QAM and the compensation QAM, the customer is able to reconstruct the MPEG stream using the compensation value data back to (or close to) its original information state prior to the lossy compression. In the alternative, the same QAM may contain both content and compensation value data for that content or for other content.

Figure 6:
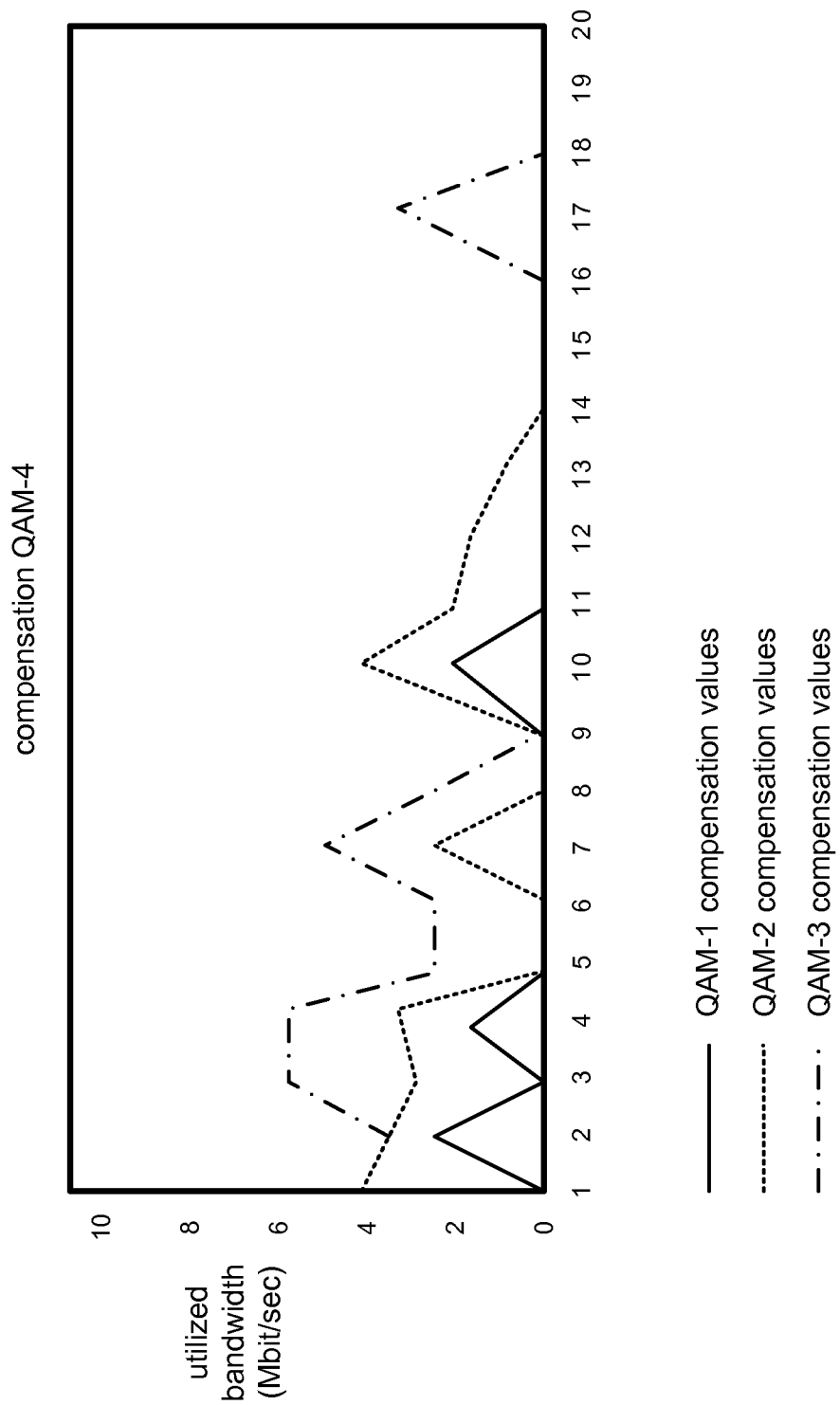
FIG. 6 is a graph showing illustrative utilized bandwidth over time within one of the frequency bands of FIG. 3 used as a compensation frequency band (e.g., compensation QAM)

FIG. 6 is a graph showing illustrative utilized bandwidth over time within one of the frequency bands of FIG. 3 used as a compensation QAM, such as QAM-4. In this example, the compensation value data for content QAM-1, content QAM-2, and content QAM-3, are all transmitted on the same compensation QAM-4. For each content QAM, the corresponding compensation value data may be identified by a unique PID identified in each compensation value data packet. As can be seen, the compensation value data may be expected to utilize significantly less bandwidth than the content to which the compensation value data corresponds. Accordingly, it may be expected that in many instances even a single compensation QAM having the same or a smaller maximum available bandwidth than a content QAM may still be able to accommodate the compensation value data for a plurality of such content QAMs. As can also be seen, at various times there are no compensation values at all for a given content QAM. These times correspond in this example to times when the content in the corresponding content QAM does not exceed the maximum available bandwidth for that content QAM.

Figure 7:
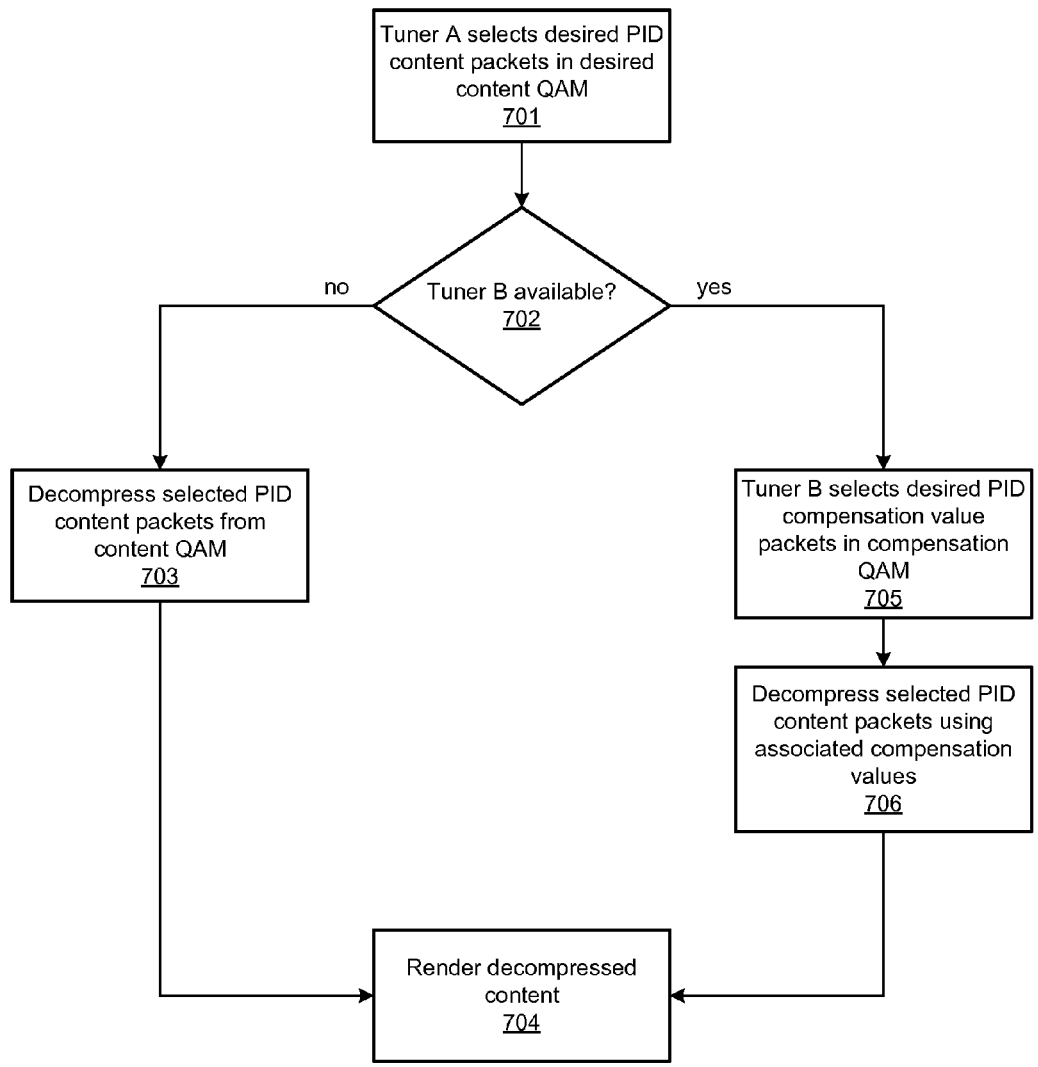
FIG. 7 is a flowchart of an illustrative process that may be performed by one or more of the clients of FIG. 1 to decompress the received compressed data utilizing compensation values.

FIG. 7 is a flowchart of an illustrative process that may be performed by CPE 105 and/or 106 of FIG. 1 to decompress the received compressed data utilizing received compensation value data. For purposes of explanation, it will be assumed that CPE 105 is performing the receiving and decompression. In step 701, CPE 105 uses Tuner A to select the desired PID of the desired channel. For example, Tuner A may select channel 2 in content QAM-1 of FIG. 4.

In step 702, CPE 105 may determine whether Tuner B (or some other tuner of CPE 105) is available. Tuner B may be unavailable for any reason, such as already being tuned to another channel being recorded to a digital video recorder. If Tuner B (or any tuner other than Tuner A) is unavailable, then decompression of the selected PID content may be performed in a conventional manner in step 703, and the resulting decompressed content may be rendered in step 704, such as by being displayed on display device 107.

If Tuner B (or any other tuner) is available, then in step 705 Tuner B selects the PID for the compensation value data that corresponds to the PID of the selected channel (in this example, the compensation value data that corresponds to content channel 2). To accomplish this, for example, CPE 105 may have stored in a computer-readable medium a table associating each channel and/or content QAM with a compensation value PID. An example of such a table is shown below in Table 1, using arbitrary PID values. Alternatively, there may be a known correspondence between content channel PIDs and compensation value PIDs, where the compensation value PID may be calculated from the content channel PID (such as by adding a constant value to the content channel PID). As yet another alternative, a low data-rate feed may be included in each content QAM (and thus received by CPE 105) that maps the PID of the content for each channel with the PID of the corresponding compensation value data. While in the example of Table 1 the PID of a channel is different from the PID of the related compensation value data, it is possible that the PID may be the same for both. The bandwidth used by the low data-rate feed may be taken into account when defining the remaining maximum bandwidth capacity of a content QAM available for channel content.

TABLE 1

| Channel PID | Compensation Value PID |
|---|---|
| 1 | 501 |
| 2 | 502 |
| 3 | 503 |
| ... | ... |
| 499 | 999 |

Then, in step 706, CPE 105 decompresses the compressed content data received by Tuner A using the associated compensation value data received by Tuner B, and the resulting decompressed content may be rendered in step 704. This process of FIG. 7 may be repeated continuously while content is being received and rendered, and CPE 105 may dynamically switch between the 702-703-704 branch of the flowchart and the 702-705-706-704 branch of the flowchart, depending upon the availability of Tuner B at any given time. Such switching may be automatic and may be transparent to the user of CPE 105. Of course, where there is no compensation value data for the selected content channel, then step 706 may be performed without the benefit of the compensation value data.

In step 706, the compensation value data may be used in a manner suitable to the type of compensation values provided and/or the type of compression experienced by the content data. For example, where the compensation values represent lower-significance layers generated using the JPEG 2000 technique or a similar technique, then one or more of those layers may be represented by the compensation values and may be added back in to the content data for decompression.

Thus, techniques for providing compensation values of content QAMs containing content that has been compressed in a lossy manner have been described. While certain embodiments have been described herein, such embodiments are merely illustrative, and variations are possible while still remaining within the scope and spirit of the present disclosure. For example, while content and compression QAMs have been illustratively described as utilizing quadrature amplitude modulation, any other type of bandwidth regions with any other type of modulation may be utilized in place of the QAM bandwidth regions described herein. Moreover, while the content QAMs as described herein have a fixed maximum bandwidth, this is not necessary. A content QAM (or other type of bandwidth region) may have a variable maximum bandwidth even though the compensation values are provided to the customer outside of that content QAM bandwidth.

The invention claimed is:

1. A method, comprising:
    compressing, by at least one computing device, at least a portion of each of a plurality of data streams to generate a plurality of compressed data streams and a plurality of compensation value data streams;
    transmitting each of the plurality of compressed data streams over different frequency bands; and
    transmitting the plurality of compensation value data streams together over a frequency band different from the frequency bands of the plurality of compressed data streams.

2. The method of claim 1, wherein for each of the plurality of data streams, the compressing is performed responsive to determining that transmission of data comprising the data stream would exceed a predetermined bandwidth.

3. The method of claim 2, wherein the predetermined bandwidth is a fixed bandwidth.

4. The method of claim 1, wherein the transmitting the plurality of compensation value data streams is performed at least partially simultaneously with the transmitting the plurality of compressed data streams.

5. The method of claim 1, wherein the transmitting the plurality of compressed data streams comprises transmitting a first data stream having a first program identifier (PID) and transmitting a second data stream having a different second PID.

6. The method of claim 5, wherein the transmitting the plurality of compensation value data streams comprises transmitting a first compensation value data stream having a third PID and transmitting a second compensation value data stream having a fourth PID, wherein the first PID, the second PID, the third PID, and the fourth PID are all different from one another.

7. The method of claim 1, further comprising:
    using a first program identifier (PID) to determine a second PID different from the first PID, wherein the compressing comprises compressing a first one of the plurality of data streams to generate a first compressed data stream and a first compensation value data stream,
    wherein:
        the transmitting the plurality of compressed data streams comprises transmitting the first compressed data stream having the first PID; and
        the transmitting the plurality of compensation value data streams comprises transmitting the first compensation value data stream having the second PID.

8. The method of claim 1, further comprising:
    combining a first program identifier (PID) with a fixed value to determine a second PID different from the first PID, wherein the compressing comprises compressing a first one of the plurality of data streams to generate a first compressed data stream and a first compensation value data stream,
    wherein:
        the transmitting the plurality of compressed data streams comprises transmitting the first compressed data stream having the first PID; and
        the transmitting the plurality of compensation value data streams comprises transmitting the first compensation value data stream having the second PID.

9. The method of claim 1, wherein the frequency band over which the plurality of compensation value data streams is transmitted does not overlap with any of the frequency bands over which the plurality of compressed data streams is transmitted.

10. The method of claim 1, wherein the transmitting the plurality of compressed data streams and the transmitting the plurality of compensation value data streams are performed by one or more transmitters.

11. A method, comprising:
    compressing, by one or more computing devices, at least a portion of first data to generate first compressed data and first compensation value data;
    compressing at least a portion of second data to generate second compressed data and second compensation value data;
    transmitting the first compressed data in a first frequency band and the second compressed data in a second frequency band different from the first frequency band; and
    transmitting the first compensation value data and the second compensation value data together in a third frequency band different from the first frequency band and different from the second frequency band.

12. The method of claim 11, wherein the transmitting the first compressed data and the transmitting the second compressed data are performed at least partially simultaneously.

13. The method of claim 11, wherein the transmitting the first compensation value data and the transmitting the second compensation value data are performed at least partially simultaneously.

14. The method of claim 11, wherein the first frequency band is a first quadrature amplitude modulation (QAM) frequency band, the second frequency band is a second QAM frequency band, and the third frequency band is a third QAM frequency band.

15. The method of claim 11, further comprising:
    using a first program identifier (PID) to determine a second PID; and
    using a third PID to determine a fourth PID,
    wherein the first compressed data comprises data packets having the first PID, the second compressed data comprises data packets having the second PID, the first compensation value data comprises data packets having the third PID, and the second compensation value data comprises data packets having the fourth PID, and wherein the first PID, the second PID, the third PID, and the fourth PID are all different from one another.

16. The method of claim 11, wherein the first compensation value data comprises information that, if combined with content of the first compressed data, results in content of the first data, and wherein the second compensation value data comprises information that, if combined with content of the second compressed data, results in content of the second data.

17. The method of claim 11, wherein:
the compressing the at least a portion of the first data comprises compressing the at least a portion of the first data responsive to determining that a bandwidth of data comprising the first data exceeds a bandwidth of the first frequency band; and
the compressing the at least a portion of the second data comprises compressing the at least a portion of the second data responsive to determining that a bandwidth of data comprising the second data exceeds a bandwidth of the second frequency band.

18. A method, comprising:
transmitting at least a plurality of data stream groups each in a different frequency band at least partially simultaneously with one another; and
responsive to determining, by one or more computing devices, for each of the plurality of data stream groups, that continued transmission of the respective data stream group will exceed a bandwidth of the frequency band for the respective data stream group:
compressing at least one data stream of each of the plurality of data stream groups to generate, for each of the respective data stream groups, a compressed data stream and a compensation value data stream;
transmitting each of the compressed data streams in the frequency band of the respective data stream group; and
transmitting the compensation value data streams of the plurality of data stream groups together in a frequency band different from each of the frequency bands of the plurality of data stream groups.

19. The method of claim 18, further comprising using, for each of the compressed data streams, a program identifier (PID) of the respective compressed data stream to determine a PID of the respective compensation value data stream different from the PID of the respective compressed data stream.

20. The method of claim 18, wherein each of the compensation value data streams comprises information that, if combined with content of a respective one of the compressed data streams, results in content of the at least one data stream of a respective one of the data stream groups.

* * * * *

UNITED STATES PATENT AND TRADEMARK OFFICE
CERTIFICATE OF CORRECTION

| | | |
|---|---|---|
| PATENT NO. | : 8,867,627 B2 | Page 1 of 1 |
| APPLICATION NO. | : 12/644377 | |
| DATED | : October 21, 2014 | |
| INVENTOR(S) | : Ross Gilson | |

It is certified that error appears in the above-identified patent and that said Letters Patent is hereby corrected as shown below:

In the specification,
Column 5, Line 50:
    Please delete "104" and insert --204--

Signed and Sealed this
Third Day of November, 2015

Michelle K. Lee
*Director of the United States Patent and Trademark Office*